United States Patent
Klein et al.

(10) Patent No.: US 9,689,377 B2
(45) Date of Patent: Jun. 27, 2017

(54) WIND TURBINE ROTOR BLADE HAVING AN ELECTRICAL HEATING DEVICE AND A PLURALITY OF LIGHTNING CONDUCTORS

(71) Applicant: Nordex Energy GmbH, Hamburg (DE)

(72) Inventors: Hendrik Klein, Rostock (DE); Nick Ohlerich, Rostock (DE)

(73) Assignee: Nordex Energy GmbH, Hamburg (DE)

( * ) Notice: Subject to any disclaimer, the term of this patent is extended or adjusted under 35 U.S.C. 154(b) by 420 days.

(21) Appl. No.: 14/282,955

(22) Filed: May 20, 2014

(65) Prior Publication Data
US 2014/0348654 A1 Nov. 27, 2014

(30) Foreign Application Priority Data

May 23, 2013 (EP) ..................................... 13002688

(51) Int. Cl.
*F03D 80/30* (2016.01)
*F03D 80/40* (2016.01)
*F03D 11/00* (2006.01)

(52) U.S. Cl.
CPC .......... *F03D 11/0025* (2013.01); *F03D 80/30* (2016.05); *F03D 80/40* (2016.05); *Y02E 10/721* (2013.01); *Y02E 10/722* (2013.01)

(58) Field of Classification Search
CPC ...... F03D 11/0025; F03D 80/30; F03D 80/40; Y02E 10/721; Y02E 10/722
USPC ...................................................... 416/95, 39
See application file for complete search history.

(56) References Cited

U.S. PATENT DOCUMENTS

| 6,612,810 | B1 | 9/2003 | Olsen et al. |
| 7,729,100 | B2 | 6/2010 | Llorente Gonzalez et al. |
| 7,896,616 | B2 | 3/2011 | Livingston et al. |
| 2006/0126252 | A1* | 6/2006 | Mortensen ............. G01W 1/16 361/118 |
| 2008/0219851 | A1* | 9/2008 | Althoff ................. F03D 1/0675 416/226 |
| 2010/0119370 | A1 | 5/2010 | Myhr |
| 2012/0321468 | A1* | 12/2012 | Hansen ............... F03D 11/0033 416/146 R |
| 2013/0022465 | A1 | 1/2013 | Stiesdal |
| 2013/0149153 | A1* | 6/2013 | Fujioka .................. H02G 13/00 416/146 R |

FOREIGN PATENT DOCUMENTS

DE 197 48 716 C1 11/1998
WO 2011/148049 A1 12/2011

* cited by examiner

Primary Examiner — R. K. Arundale
Assistant Examiner — Kelsey Rohman
(74) Attorney, Agent, or Firm — Walter Ottesen, P.A.

(57) ABSTRACT

A wind turbine rotor blade includes: a rotor blade root; a rotor blade tip; an electrical heating device; a first lightning receptor disposed in the region of the rotor blade tip; precisely two lightning conductors leading from the lightning receptor to the rotor blade root; a second lightning receptor arranged at a distance to the rotor blade tip and connected to one of the lightning conductors; and, each one of the two lightning conductors being electrically conductively connected to the electrical heating device at a multiplicity of points between the rotor blade root and the rotor blade tip so as to cause equipotential bonding between the two lightning conductors via the electrical heating device in response to a lightning strike to the rotor blade.

14 Claims, 3 Drawing Sheets

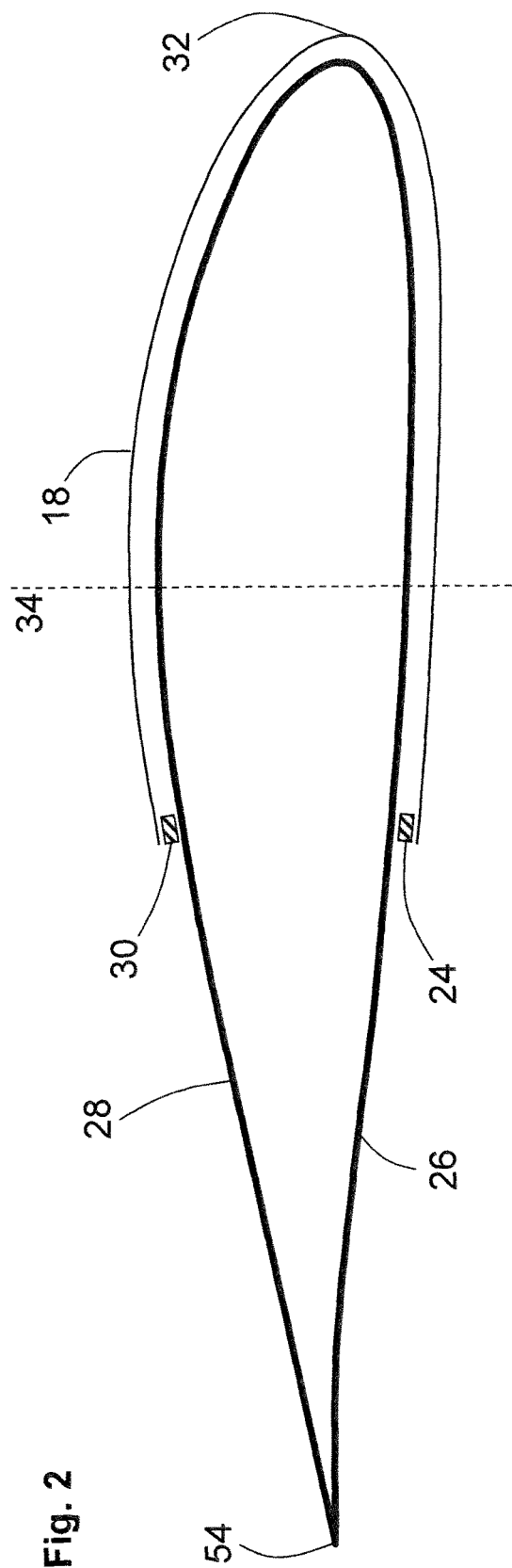
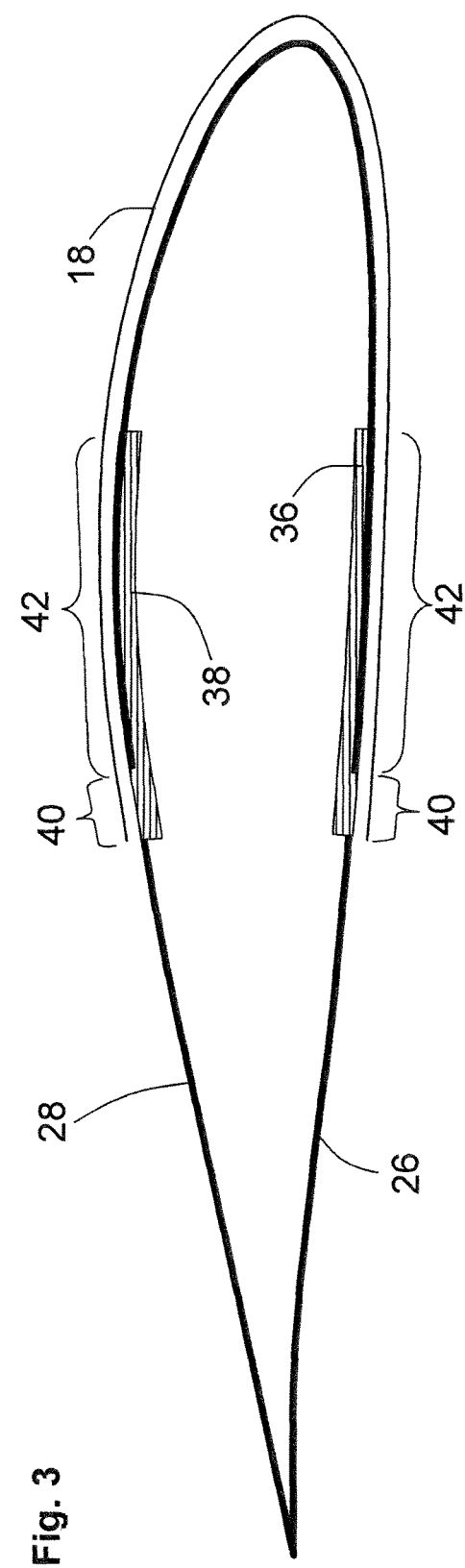

WIND TURBINE ROTOR BLADE HAVING
AN ELECTRICAL HEATING DEVICE AND A
PLURALITY OF LIGHTNING CONDUCTORS

CROSS REFERENCE TO RELATED APPLICATION

This application claims priority of European patent application no. 13002688.3, filed May 23, 2013, the entire content of which is incorporated herein by reference.

FIELD OF THE INVENTION

The invention relates to a wind turbine rotor blade having a rotor blade root, a rotor blade tip, an electrical heating device, a lightning receptor in the region of the rotor blade tip and a plurality of lightning conductors leading from the lightning receptor to the rotor blade root.

BACKGROUND OF THE INVENTION

As a result of their large physical height, wind turbines are often affected by lightning strikes. Most frequently, the lightning strikes in the region of the rotor blade tip when the rotor blade is pointing upwards at an angle or straight. In order to prevent destruction of the rotor blade by the lightning strike, it has long been known to arrange a lightning receptor in the region of the rotor blade tip and to connect it to a lightning conductor. The current from lightning striking the lightning receptor is then discharged via the lightning conductor to the rotor blade root, from there into the hub via the nacelle and the tower to ground. Primarily copper cables with a relatively large cross section are arranged within the rotor blade, in particular along a spar or shear web of the rotor blade, as lightning conductor.

In order to counteract icing-over of the rotor blades, electrical heating devices are used. These are made of an electrically conductive material and a heating current flows through them during operation; the heating current results in heating of the heating device. Such heating devices are additional electrically conductive structures in or on the rotor blade which are typically arranged over a large length more or less parallel to the lightning conductor. In the event of a lightning strike, electrical currents with very high and rapidly rising current intensities are discharged via the lightning conductor which, on the basis of Ampere's Law with Maxwell's correction, produces a severely variable magnetic field in the surrounding environment of the lightning conductor. On the basis of the Maxwell-Faraday equation, high voltages can be induced in the electrical heating device as a result, which results in potential differences between the lightning conductor and the heating device or between the lightning conductor and the electrical conductors connected to the heating device. Depending on the current gradient and the geometric relationships in the rotor blade, these potential differences can amount to several megavolts, with the result that flashovers occur between the lightning conductor and the electrical heating device or the electrical conductors. This can result in damage to the heating device or adjacent structures of the rotor blade, up to total damage.

U.S. Pat. No. 7,729,100 discloses a wind turbine rotor blade having a supporting structure consisting of carbon fibers. The wind turbine rotor blade does not have an electrical heating device. A lightning conductor is connected to metal plates on the supporting structure via a plurality of cables in order to bring about equipotential bonding between the lightning conductor and the electrically conductive supporting structure.

Publication WO 2011/148049 A1 discloses a wind turbine rotor blade having a box-shaped supporting structure and profile leading edges and profile end edges attached thereto. An electrical heating device which has a plurality of heating wires is provided in the region of the profile leading edges. In addition, there is a plurality of lightning conductors, which are arranged distributed over the box-shaped supporting structure and the profile leading edges.

U.S. Pat. No. 6,612,810 discloses a wind turbine rotor blade having a central lightning conductor arranged approximately centrally in the rotor blade. A lightning receptor arranged in the region of the rotor blade tip is connected to this central lightning conductor. An electrical heating device having a plurality of electrical heating elements is provided in the region of the profile leading edge.

The electrical heating elements are connected to two electrical connecting lines running in the longitudinal direction of the rotor blade, with the result that a heating current can be supplied to the electrical heating elements. Those ends of the electrical connecting lines for the heating elements which are on the rotor blade tip side are connected to the lightning receptor via spark gaps. As a result, some of the lightning current is intended to be discharged by the electrical connecting lines of the heating elements, with the result that these connecting lines also act as lightning conductors. The potential difference between the two connecting lines should always be zero or so low that the heating elements cannot be damaged by the lightning strike.

SUMMARY OF THE INVENTION

It is an object of the invention to provide a wind turbine rotor blade having an electrical heating device and a lightning conductor wherein the rotor blade has improved lightning protection.

The wind turbine rotor blade according to the invention has a rotor blade root, a rotor blade tip, an electrical heating device, a lightning receptor in the region of the rotor blade tip and a plurality of lightning conductors leading from the lightning receptor to the rotor blade root. The wind turbine rotor blade is characterized in that precisely two of the lightning conductors are provided;
at least one further lightning receptor is provided which is arranged at a distance from the rotor blade tip and is connected to one of the lightning conductors; and,
each of the two lightning conductors is electrically conductively connected to the electrical heating device at a multiplicity of points between the rotor blade root and the rotor blade tip, with the result that, in the event of a lightning strike, equipotential bonding between the two lightning conductors takes place via the electrical heating device.

The wind turbine rotor blade can be intended for a wind turbine having a rotor with a horizontal axis. It can be made from a fiber-reinforced plastics material, for example, in a vacuum infusion process. It can be assembled from two prefabricated rotor blade half-shells, in particular from a pressure side rotor blade half-shell and a suction side rotor blade half-shell. The wind turbine rotor blade can have a supporting structure including one or more spar caps and one or more shear webs arranged between two half-shells or two spar caps. Alternatively, the rotor blade can have a spar as the central supporting structure, for example with a box configuration. The mentioned supporting structure elements, in particular the spar caps, can be connected to the rotor blade half-shells before the rotor blade half-shells are assembled to form a rotor blade. For this purpose, they can be prefabricated separately and integrated in the half-shells during production of the half-shells. Alternatively, they can be produced together with the remaining component parts of the half-shells, for example by reinforcing fibers being inserted into the half-shell forms.

A blade connection region for connection to a rotor hub can be formed at the rotor blade root of the wind turbine rotor blade, for example, a fastening flange. The wind turbine rotor blade has, in cross section, an aerodynamic profile with a profile leading edge and a profile end edge. The wind turbine rotor blade can have a length of, for example, 30 m or more, in particular of 50 m or more.

In order to prevent icing-over or to counteract existing icing-over, the wind turbine rotor blade has an electrical heating device. This can extend over a part or over the entire length of the wind turbine rotor blade. The electrical heating device is configured such that electrical current flows through it and heats it. It can be arranged in the region of the profile leading edge of the wind turbine rotor blade. In particular, the electrical heating device can extend approximately from the profile leading edge up to a profile thickness reserve, both on the pressure side and on the suction side of the wind turbine rotor blade. The electrical heating device can be configured to heat the mentioned surface region of the wind turbine rotor blade more or less uniformly. The electrical heating device can be arranged on an aerodynamic surface of the wind turbine rotor blade.

The wind turbine rotor blade has a lightning receptor in the region of the rotor blade tip. This can in particular be a metallic body which forms part of the surface of the wind turbine rotor blade or is arranged closely adjacent to this surface, for example only separated from the surface by a layer of paint. The lightning receptor in the region of the rotor blade tip can also be formed by the rotor blade tip itself, which in this case is preferably made of metal. Alternatively, lightning receptors can be arranged on the suction and/or pressure side of the rotor blade in the region of the rotor blade tip. Such a lightning receptor which does not include the rotor blade tip itself is likewise located in the region of the rotor blade tip and can reach up directly as far as the rotor blade tip or have a small distance from the rotor blade tip, for example a distance in the range of 1 cm to 25 cm, in particular in the range of 5 cm to 20 cm or in the range 10 cm to 15 cm. The term "distance" is intended now and in the following text to mean the distance between the rotor blade tip and that point of the lightning receptor which is nearest to the rotor blade tip. In general, a lightning receptor can be considered as being arranged in the region of the rotor blade tip when its distance from the rotor blade tip is less than 25 cm, in particular less than 15 cm.

A plurality of lightning conductors lead from the lightning receptor to the rotor blade root. These lightning conductors can be arranged at a distance from one another over their entire length between the lightning receptor and the rotor blade root. In the region of the rotor blade root, the lightning conductors can have one or more grounding connections, via which a connection to further lightning conductors can be produced in a rotor hub, a nacelle and/or a tower of a wind turbine. In this manner, the lightning current from a lightning strike can be discharged via the lightning conductors to ground. The lightning conductors are dimensioned such that they can discharge the current intensities occurring in the event of a lightning strike of, for example, 50 kA or more, without being destroyed. In this case, the lightning current in the rotor blade can be divided amongst a plurality of conductors or else discharged substantially by only one of the lightning conductors. In the event that the lightning current is discharged via a plurality of conductors, the lightning current at the lightning receptors and/or in the region of the blade root can be combined onto one lightning conductor.

Precisely two lightning conductors are provided in the invention. Each of these two lightning conductors is configured to discharge, possibly also on its own, the current of a lightning strike without being damaged thereby.

At least one further lightning receptor is arranged at a distance from the rotor blade tip and is connected to one of the lightning conductors. The at least one further lightning receptor is located outside the region of the rotor blade tip. Its distance from the rotor blade tip can be, for example, 30 cm or more, for example approximately 50 cm or more. Lightning strikes occurring at a distance from the rotor blade tip can be discharged via this at least one further lightning receptor. By using a separate lightning receptor, damage to the rotor blade in this region can be avoided. A lightning strike in the further lightning receptor is substantially discharged via the lightning conductor connected to the further lightning receptor. It goes without saying that part of the lightning current can also be discharged via the other lightning conductor.

Each of the two lightning conductors is electrically conductively connected to the electrical heating device at a multiplicity of points between the rotor blade root and the rotor blade tip. In the event of a lightning strike, equipotential bonding can take place between the two lightning conductors via the electrical heating device.

The invention is based on the knowledge that, in particular in the case of large rotor blades which have a plurality of electrically conductive structures, equipotential bonding is required between these structures in order to avoid damage as a result of voltages and currents which are induced in the relevant component parts by a lightning current rising suddenly in a few µs. In particular, the inventors have identified that, for the necessary equipotential bonding, it is not only a matter of high electrical conductivity of the equipotential bonding element used. If the equipotential bonding is brought about at a multiplicity of points at a greater or lesser distance from one another, the multiplicity of connections between the two lightning conductors contributes substantially to the potential differences occurring over a single equipotential bonding element being limited. The inventors have established that such equipotential bonding brought about at a multiplicity of adjacent points can be provided not only by cables or other conductors with a correspondingly low resistance, but also by electrical heating devices which have a comparatively high resistance owing to the heating taking place. Surprisingly, it has been established that the current loading capacity of electrical heating devices in the event of current loading during a lightning strike has also increased temporarily. In particular, the high degree of resistance to temperatures of such heating devices contributes to this.

A particular advantage of the invention is that, as a result of the equipotential bonding brought about via the electrical heating device, it is possible to work with additional lightning receptors at a distance from the rotor blade tip. If lightning strikes into such a lightning receptor, in contrast to a lightning strike in a lightning receptor located at the rotor blade tip, there is necessarily an asymmetric current distribution among the two lightning conductors. Without equipotential bonding between the two lightning conductors, this can result in damage to the wind turbine rotor blade as a result of induced voltages and currents. As a result of the equipotential bonding via the electrical heating device, such damage is reliably prevented.

In an embodiment, each of the lightning conductors is in electrical contact with the electrical heating device along the entire length of the electrical heating device. In particular, peripheral sections or edges of the electrical heating device can be connected to the adjacently arranged lightning conductors in such a manner that electrical contact which is continuous in a longitudinal direction of the lightning conductors is produced. Likewise included is contact-making between the electrical heating device and the adjacently arranged lightning conductors at short distances of, for example, 10 cm or less, in particular 1 cm or less, which corresponds to quasi-continuous electrical contact-making over the length of the electrical heating device. In any case, particularly effective equipotential bonding between the two lightning conductors is achieved.

In an embodiment, the electrical heating device can be supplied a heating current via the two lightning conductors. This means that the connection between the heating device and the lightning conductors is configured in a suitable manner for this and that the lightning conductors are connected to a heating current supply device, or are provided or suitable for this purpose. One advantage of this embodiment is the particularly simple configuration, in which the two lightning conductors are used simultaneously for discharging lightning currents and for supplying current to the electrical heating device.

In an embodiment, the electrical heating device is configured in such a manner that a heating current supplied to it via the two lightning conductors flows transversely to a longitudinal direction of the rotor blade through the electrical heating device. For this purpose, the electrical heating device can have, for example, a flat, film-like material or else a multiplicity of electrically conductive wires or fibers arranged flat. The electrical conductivity of the heating device in the mentioned direction is particularly advantageous for effective equipotential bonding.

In an embodiment, one of the lightning conductors has a metallic conductor which runs over the entire length of the electrical heating device. The metallic conductor can be, for example, a solid metal profile, a cable with a single conductor or a multiplicity of conductors such as wires or litz wires and with a flat, angular or round cross section. The metallic conductor can in particular be made of copper. It is likewise possible to use aluminum or other metals which have sufficient conductivity. The metallic conductor can have a cross section of, for example, 25 mm$^2$ or more, in particular approximately 50 mm$^2$ or more when using copper. The lightning conductor can be made exclusively of such a metallic conductor, but can also be combined with further electrically conductive elements to form the lightning conductor.

In an embodiment, the rotor blade has an electrically conductive main spar cap, which extends over the entire length of the electrical heating device, and the lightning conductor or part thereof is formed by the electrically conductive main spar cap. The electrically conductive main spar cap can in particular include a carbon fiber material. It forms part of a supporting structure which absorbs the majority of the mechanical loads on the wind turbine rotor blade. The lightning conductor can be formed exclusively from the main spar cap over its entire length or over the entire length of the electrical heating device. Alternatively, it can be combined with further electrically conductive materials to form the lightning conductor. The use of an electrically conductive main spar cap as lightning conductor or the inclusion thereof in the lightning conductor is advantageous because separate equipotential bonding between the lightning conductor and the main spar cap is in this case not required. Additional problems resulting from induction of voltages or currents in the main spar cap on discharge of a lightning current by a lightning conductor arranged adjacent to the main spar cap are ruled out from the outset. At the same time, it is possible to dispense with additional lightning conductors or electrical connecting lines for the heating device.

In an embodiment, the main spar cap has an outer side which faces an aerodynamic surface of the wind turbine rotor blade, wherein a first section of the outer side, which first section extends in the form of a strip in a longitudinal direction of the rotor blade, is in electrical contact with the electrical heating device, and a second section of the outer side is separated from the electrical heating device by an electrically insulating material layer. In particular, a direct electrical contact between the first section of the outer side and the electrical heating device can be provided. The electrically insulating material layer can have, for example, a single layer or a plurality of layers of glass-fiber-reinforced plastics material from which parts of the rotor blade half-shell, which is combined with the main spar cap, are made. The second section of the outer side of the main spar cap can likewise be strip-shaped and run in the longitudinal direction of the rotor blade. As a result of the mentioned type of contact-making, the supply of current to the electrical heating device is performed via the main spar cap in a targeted manner in the region of the first section of the outer side of the main spar cap. As a result, the heating device can already have the desired heating effect in the region of the second section of the outer side.

In an embodiment, the lightning conductor is formed in the region of the electrical heating device by the main spar cap and an adjacently arranged metallic conductor. The two elements are in electrical contact with one another and jointly form one of the two lightning conductors. It goes without saying that the two lightning conductors can also be configured in this way; this also applies to the embodiments described above and below. The additional metallic conductor can increase the current-carrying capacity of the combined lightning conductor. In addition, it can simplify the electrical contact-making of the heating device, which can take place via the metallic conductor. In particular, the metallic conductor can extend over the entire length of the electrical heating device and/or the main spar cap. If the main spar cap ends at a distance from the rotor blade tip, the metallic conductor can extend beyond the end of the main spar cap as far as the lightning receptor in the region of the rotor blade tip.

In an embodiment, a metallic grid is arranged between the main spar cap and the adjacently arranged metallic conductor. The metallic grid can be, for example, a wire mesh, wire woven fabric or wire nonwoven fabric made of copper wires or copper litz wires. This favors electrical contact-making over a large area of the main spar cap and thus avoids damage as a result of nonuniform discharge of the lightning current.

In an embodiment, the electrical heating device includes a carbon fiber material. In principle, the electrical heating device can also be made of a metallic material, in particular resistance wires or a film with a defined electrical resistance. The use of a carbon fiber material is characterized by particularly simple integration in the structure and the manufacturing processes of the wind turbine rotor blade.

In an embodiment, a connection between one of the lightning conductors and the lightning receptor in the region of the rotor blade tip and/or the at least one further lightning receptor and/or a grounding connection in the region of the rotor blade root has a spark gap and/or a vacuum interrupter. A corresponding connection between the respective other lightning conductor and the remaining mentioned elements can be formed in the same manner. Other components that can be used as surge receptors can likewise be used for the connection. The spark gap and/or the vacuum interrupter or another corresponding surge receptor ensure electrical insulation between the mentioned elements below a predetermined potential difference. As a result, the lightning conductors can easily be used for supplying current to the electrical heating device with operating voltages in the range of, for example, 400 V or more, in particular up to 1000 V. At relatively high voltages, for example of several megavolts as in the case of a lightning strike, flashovers occur and the lightning current can be discharged via the spark gap and/or the vacuum interrupter or the other surge receptor.

The connection between one of the lightning conductors and the lightning receptor in the region of the rotor blade tip and/or the at least one further lightning receptor can also be in the form of segmented diverter strips. A segmented diverter strip can have a multiplicity of conductors arranged at distances from one another, for example blocks or sheets of a metal such as copper or aluminum, in particular arranged on an electrically insulating substrate material such as an adhesive strip. The diverter strips can be arranged on the surface of the rotor blade and can be cohesively connected thereto. This enables easy fitting and accessibility of the surge receptors without bringing about significant changes in the contour of the rotor blade. In particular, it is possible to use the segmented diverter strip to bridge a distance between a lightning conductor and a lightning receptor, in particular a distance between a blade tip side end of a lightning conductor in the region of a blade tip side end of the heating device and the lightning receptor in the region of the rotor blade tip.

In an embodiment, one of the two lightning conductors is arranged on a pressure side and the other of the two lightning conductors is arranged on a suction side of the rotor blade. The lightning receptors arranged on both sides of the wind turbine rotor blade are connected to a respective lightning conductor, with the result that damage can be avoided in the event of a lightning strike on the side remote from a lightning receptor.

In an embodiment, all of the lightning receptors provided are arranged at a distance of 20% or less of the length of the rotor blade away from the rotor blade tip. In particular, all of the lightning receptors can be arranged at a distance of 15% or less or even only 10% or less of the length away from the rotor blade tip. Experience tells us that a lightning strike is particularly frequent in these regions of the rotor blade which are close to the rotor blade tip and providing additional lightning receptors at this location on the rotor blade is particularly important.

BRIEF DESCRIPTION OF THE DRAWINGS

The invention will now be described with reference to the drawings wherein:

FIG. 2 shows a cross section through the rotor blade shown in FIG. 1 at the location denoted by A-A in a simplified, schematic illustration;

FIG. 3 shows a cross section through another wind turbine rotor blade having two electrically conductive main spar caps in a simplified schematic illustration;

DESCRIPTION OF THE PREFERRED
EMBODIMENTS OF THE INVENTION

Figure 1:
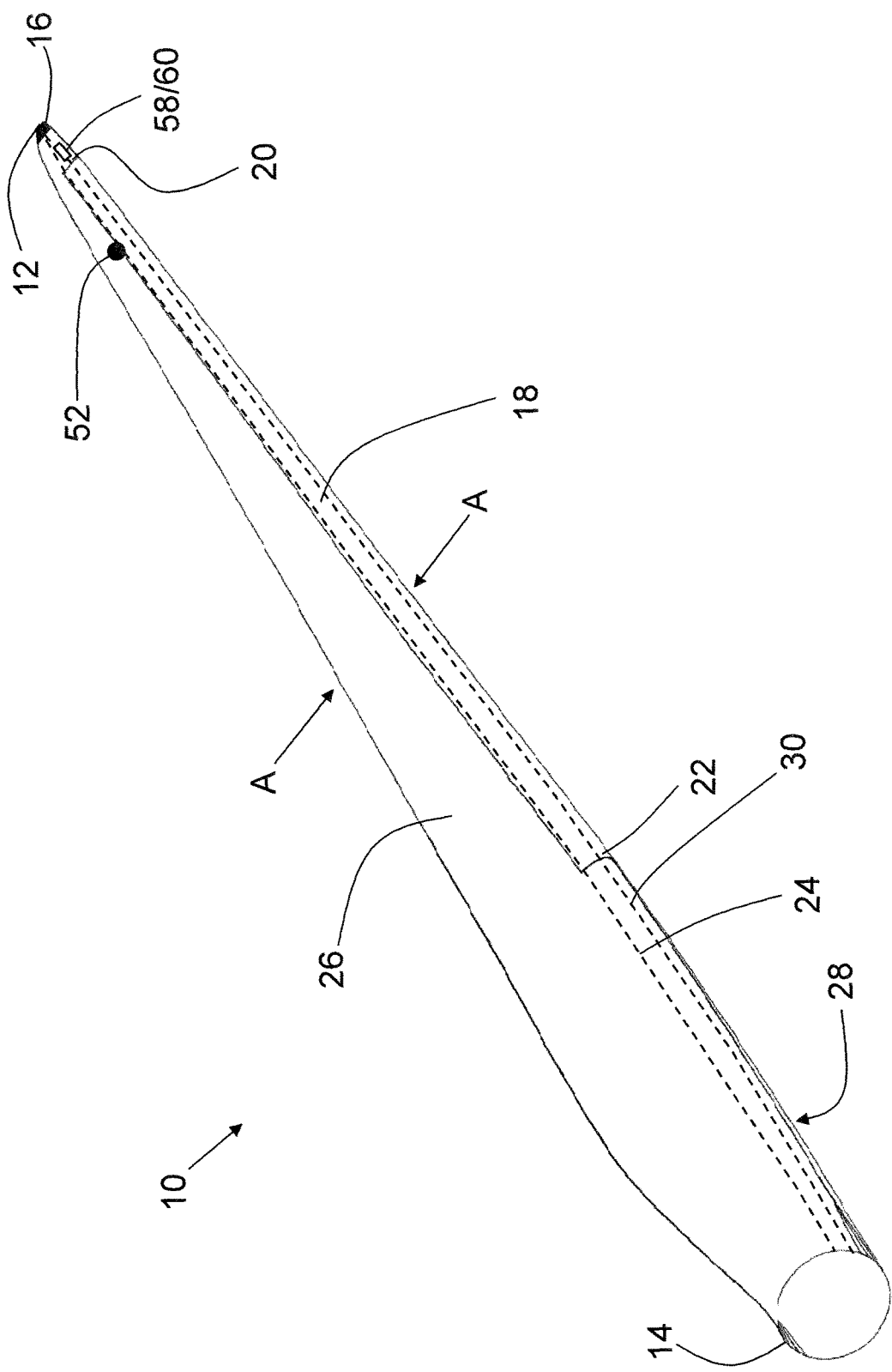
FIG. 1 shows a rotor blade according to the invention in a simplified, perspective view.

The wind turbine rotor blade 10 shown in FIG. 1 has a rotor blade tip 12 and a rotor blade root 14. A lightning protection receptor 16, which forms the rotor blade tip 12, is arranged in the region of the rotor blade tip 12. The rotor blade 10 has a pressure side 26 facing the viewer and a suction side 28 remote from the viewer.

An electrical heating device 18 is arranged in the region of the profile leading edge of the rotor blade 10. It has a rotor blade tip side end 20 and a rotor blade root side end 22 and extends over a large proportion of the length of the rotor blade 10 up to close to the rotor blade tip 12.

FIG. 1 also shows a first lightning conductor 24 which has a metallic conductor. The metallic conductor extends from the rotor blade root 14 up to the rotor blade tip 12 and is connected there to the lightning protection receptor 16. As shown in FIG. 1, the first lightning conductor 24 runs substantially adjacent to a rim of the electrical heating device 18 which is arranged on the pressure side 26. There, it is conductively connected to the electrical heating device 18 at a multiplicity of points.

A second lightning conductor 30 likewise extends from the rotor blade root 14 up to the rotor blade tip 12 and is connected there to the lightning receptor 16. The connection between the second lightning conductor 30 and the lightning protection receptor 16 includes a spark gap 58, or, as an alternative, a vacuum interrupter 60. The second lightning conductor 30 runs on the suction side 28 of the wind turbine rotor blade 10 and is arranged in the region of the electrical heating device 18 adjacent to a rim of the electrical heating device 18 arranged on the suction side 28 and is conductively connected there to the electrical heating device 18 at a multiplicity of points.

A further lightning receptor 52 is located on the pressure side 26 at a distance of approximately 10% of the total length of the rotor blade from the rotor blade tip 12. The further lightning receptor 52 is electrically conductively connected to the first lightning conductor 24. A lightning receptor, which is connected to the second lightning conductor (not illustrated), is likewise located on the suction side 28 in the same position.

Further details are apparent from the cross-sectional illustrations in FIGS. 2 to 5. FIG. 2 shows the pressure side 26 and the suction side 28 of the wind turbine rotor blade 10 from FIG. 1 in cross section. The profile end edge 54 and the profile leading edge 32 are shown. The position of the profile thickness reserve 34, that is the greatest profile thickness, is indicated by a dashed line 34. The electrical heating device 18 extends from the first lightning conductor 24 on the pressure side 26 forwards around the profile leading edge 32 and from there on the suction side 28 back to the second lightning conductor 30.

The peripheral regions of the electrical heating device 18 arranged in the region of the first lightning conductor 24 and the second lightning conductor 30 are each connected to one of the two lightning conductors. An electrical heating current is supplied to the peripheral regions via these lightning conductors 24, 30. At the same time, the electrical heating device 18 causes equipotential bonding owing to the mentioned electrical connection to the two lightning conductors 24, 30 in the event of a lightning strike. The electrical heating device 18 is connected to the two lightning conductors 24, 30 not only in the mentioned cross-sectional position, but continuously over the entire length of the electrical heating device 18.

The two lightning conductors 24, 30 are made of copper conductors with a total cross-sectional area of at least 50 mm².

In the exemplary embodiment in FIG. 3, the rotor blade has two electrically conductive main spar caps 36, 38 which are substantially made of a carbon-fiber-reinforced plastics material. A first main spar cap 36 is arranged on the pressure side 26, and a second main spar cap 38 is arranged on the suction side 28. The remaining elements of the half-shells assembled to form the rotor blade, which elements are illustrated by a thicker continuous line, are substantially made of a glass-fiber-reinforced plastics material which is electrically insulating. The electrical heating device 18 extends over the same region of the cross section as explained with reference to FIG. 2. In contrast to FIG. 2, however, there are no metallic conductors which form the two lightning conductors. Instead, the pressure side main spar cap 36 forms the first lightning conductor 24 and the suction side main spar cap 38 forms the second lightning conductor 30.

Each of the two main spar caps 36, 38 has an outer side, which faces an aerodynamic surface of the wind turbine rotor blade. In each case a first section 40 of this outer side is in electrical contact with a peripheral section of the electrical heating device 18 and in each case a second section 42 of this outer side is electrically insulated from the electrical heating device 18 by the glass-fiber-reinforced plastics material of the rotor blade half-shell. As a result, when an electrical heating current is supplied, the electrical heating current flows through the electrical heating device 18 via the two main spar caps 36, 38 in each case starting from peripheral sections of the main spar caps with which sections there is contact in the first sections 40.

Figure 4:
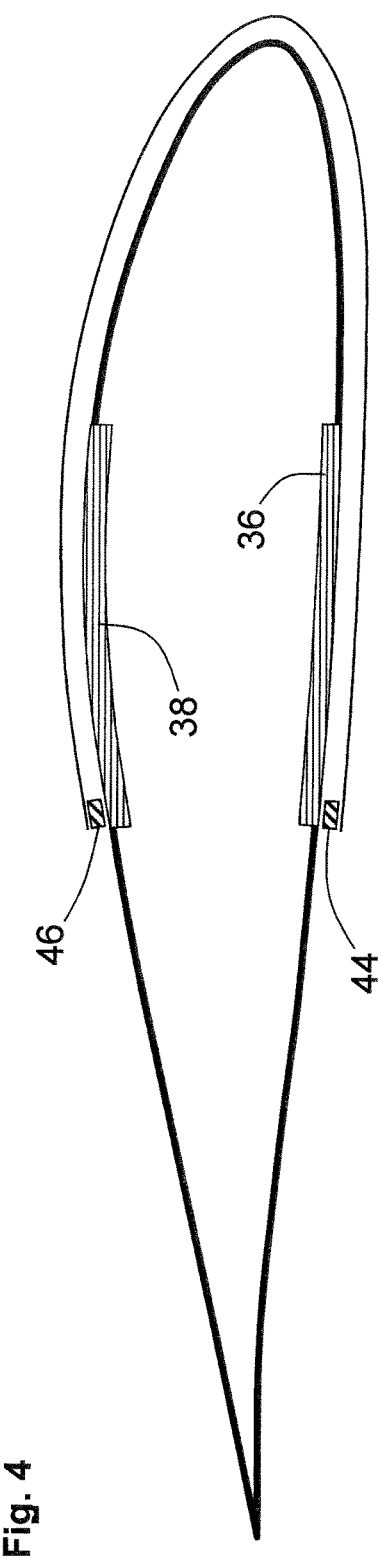
FIG. 4 shows a cross section through another wind turbine rotor blade having two lightning conductors with each having a metallic conductor and an electrically conductive main spar cap; and, FIG. 5 shows a cross section through a further wind turbine rotor blade, in which a metallic grid is arranged between the main spar cap and the metallic conductor.

In the exemplary embodiments shown in FIG. 4, there are likewise two electrically conductive main spar caps 36, 38. These are combined with metallic conductors 44, 46, whose arrangement corresponds to the metallic conductors of the first lightning conductor 24 and the second lightning conductor 30 shown in FIG. 2. The combination of the pressure-side main spar cap 36 and the metallic conductors 44 forms a first lightning conductor 24. The combination of the suction side main spar cap 38 and the metallic conductor 46 forms the second lightning conductor 30. To this extent, in this exemplary embodiment too, there are precisely two lightning conductors 24, 30. Further electrically conductive elements which contribute to the discharge of a lightning current to a non-negligible degree are not provided, as is also the case in the other exemplary embodiments.

Figure 5:
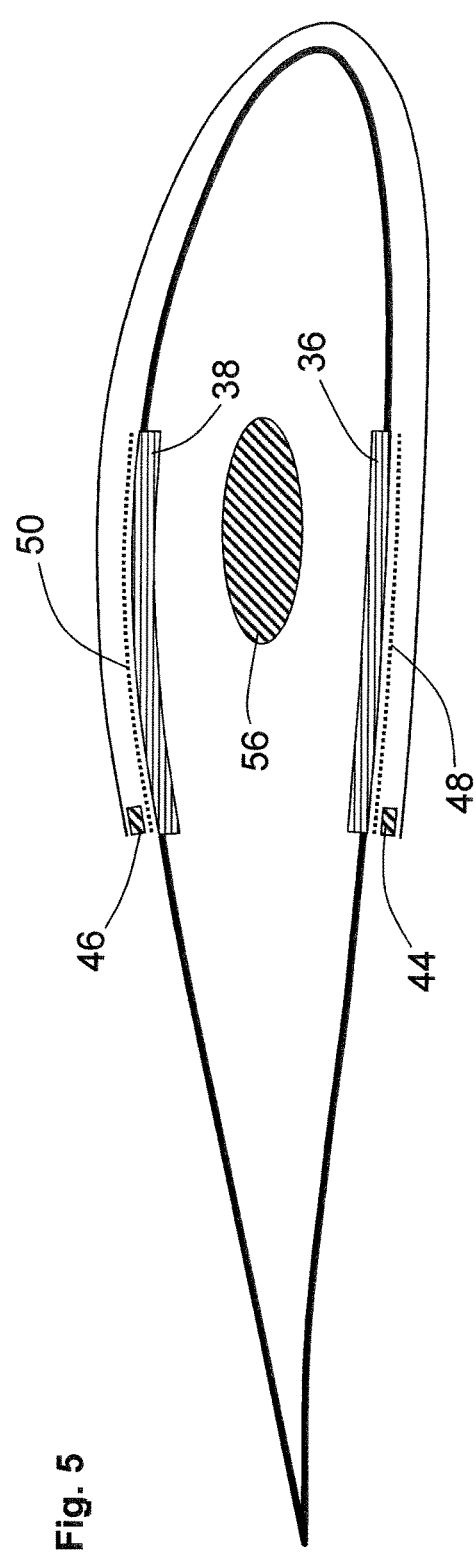

In the exemplary embodiment shown in FIG. 5, substantially an arrangement of two electrically conductive main spar caps 36, 38 and metallic conductors 44, 46 connected thereto corresponding to FIG. 4 is provided. In order to achieve contact with the main spar caps 36, 38 over a larger area, in each case a metallic grid 48, 50 is arranged between these elements.

It goes without saying that, in the exemplary embodiments of FIGS. 4 and 5, the electrical contact between the heating device 18 and the lightning conductors, which are combined from the mentioned elements, can be made exclusively via the metallic conductors 44, 46. Those sections of the electrical heating device which are arranged adjacent thereto above and below the main spar caps 36, 38 and metallic grids 48, 50, respectively, can be separated therefrom by an electrically insulating material layer.

In FIG. 5, the electrically conductive structures, that is in the example the electrical heating device 18, the metallic conductors 44, 46, the main spar caps 36, 38 and the metallic grids 48, 50, together form a type of Faraday's cage, in which, even in the event of a lightning strike, only low potential differences occur. The voltage-free space 56 resulting in the case of idealized consideration is illustrated in the figure. It is particularly suitable for accommodating further electrical lines which are required, for example, for connecting units accommodated in the rotor blade such as sensors or actuators because lines arranged in the voltage-free space 56 or the units connected thereto are not damaged as a result of electromagnetic induction in the event of a lightning strike.

It is understood that the foregoing description is that of the preferred embodiments of the invention and that various changes and modifications may be made thereto without departing from the spirit and scope of the invention as defined in the appended claims.

LIST OF REFERENCE NUMERALS USED

10 Wind turbine rotor blade
12 Rotor blade tip
14 Rotor blade root
16 Lightning receptor
18 Electrical heating device
20 Blade tip side end
22 Blade root side end
24 First lightning conductor
26 Pressure side
28 Suction side
30 Second lightning conductor
32 Profile leading edge
34 Profile thickness reserve
36 Pressure side main spar cap
38 Suction side main spar cap
40 First section
42 Second section
44 Metallic conductor
46 Metallic conductor
48 Metallic grid
50 Metallic grid
52 Further lightning receptor
54 Profile end edge
56 Voltage-free space
58 Spark gap
60 Vacuum interrupter

What is claimed is:
1. A wind turbine rotor blade comprising:
a rotor blade root;
a rotor blade tip;
an electrical heating device;

a first lightning receptor disposed in the region of the rotor blade tip;
at least but not more than two lightning conductors leading from said first lightning receptor to said rotor blade root;
a second lightning receptor arranged at a distance to said rotor blade tip and connected to only one of said lightning conductors; and,
each one of said two lightning conductors being electrically conductively connected to said electrical heating device at a multiplicity of points between said rotor blade root and said rotor blade tip so as to cause equipotential bonding between said two lightning conductors via said electrical heating device in response to a lightning strike to said rotor blade.

2. The wind turbine rotor blade of claim 1, wherein each of said two lightning conductors is in electrical contact to said electrical heating device along the entire length of said electrical heating device.

3. The wind turbine rotor blade of claim 1, wherein said electrical heating device is configured to be supplied with heating current via said two lightning conductors.

4. The wind turbine rotor blade of claim 3, wherein the rotor blade defines a longitudinal direction and said heating device is configured such that said heating current supplied to said heating device via said two lightning conductors flows transverse to said longitudinal direction.

5. The wind turbine rotor blade of claim 1, wherein said heating device has a predetermined length; and, one of said lightning conductors includes a metallic conductor extending over the entirety of said predetermined length of said heating device.

6. The wind turbine rotor blade of claim 1, wherein the heating device has a predetermined length, the wind turbine rotor blade further comprising:
an electrically conductive main spar cap extending over all of said predetermined length of said heating device; and,
at least one of said two lightning conductors is at least partially defined by said electrically conductive main spar cap.

7. The wind turbine rotor blade of claim 6 further comprising:
an electrically insulating layer;
the wind turbine rotor blade defining an aerodynamic surface and a longitudinal direction;
said main spar cap having an outer side facing said aerodynamic surface;
said outer side having a first section extending in the form of a strip in said longitudinal direction;
said first section being in electrical contact with said heating device; and,
said outer side further having a second section separated from said heating device by said electrically insulating layer.

8. The wind turbine rotor blade of claim 6, wherein:
a first one of said two lightning conductors includes a metallic conductor arranged adjacent to said main spar cap; and,
said first one of said two lightning conductors is, in the region of the heating device, formed by said main spar cap and said metallic conductor.

9. The wind turbine rotor blade of claim 8 further comprising a metallic grid arranged between said main spar cap and said metallic conductor.

10. The wind turbine rotor blade of claim 1, wherein said heating device includes carbon fiber material.

11. The wind turbine rotor blade of claim 1 further comprising a ground terminal in the region of said rotor blade root; a connection between one of said two lightning conductors and at least one of said first lightning receptor, said second lightning receptor and said ground terminal; and, said connection having at least one of a spark gap and a vacuum interrupter.

12. The wind turbine rotor blade of claim 1, wherein:
the wind turbine rotor blade has a pressure side and a suction side; and,
one of said first and second lightning conductors is arranged on said pressure side and the other one of said first and second lightning conductors is arranged on said suction side of said wind turbine rotor blade.

13. The wind turbine rotor blade of claim 1, wherein:
the wind turbine rotor blade has a pressure side and a suction side; and,
said wind turbine rotor blade comprises third and fourth lightning receptors mounted on said pressure and suction sides, respectively.

14. The wind turbine rotor blade of claim 13, wherein:
the wind turbine rotor blade has a predetermined length; and,
said lightning receptors are arranged at a distance of at most 20% of said predetermined length away from said rotor blade tip.

* * * * *